(12) United States Patent
Hurwitz et al.

(10) Patent No.: US 12,456,979 B2
(45) Date of Patent: Oct. 28, 2025

(54) ELECTRONIC CHIP IDENTITY

(71) Applicant: Analog Devices International Unlimited Company, Limerick (IE)

(72) Inventors: Jonathan Ephraim David Hurwitz, Edinburgh (GB); Jose Bernardo Din, Calabarzon (PH); Albert Lastimada, Calabarzon (PH); Herlan Kester Benitez, Central Luzon (PH)

(73) Assignee: Analog Devices International Unlimited Company, Limerick (IE)

(*) Notice: Subject to any disclaimer, the term of this patent is extended or adjusted under 35 U.S.C. 154(b) by 150 days.

(21) Appl. No.: 18/334,114

(22) Filed: Jun. 13, 2023

(65) Prior Publication Data
US 2024/0421819 A1     Dec. 19, 2024

(51) Int. Cl.
H03K 19/003     (2006.01)

(52) U.S. Cl.
CPC .................................. H03K 19/003 (2013.01)

(58) Field of Classification Search
CPC .................. H03K 19/003; G06F 21/73; G06F 2221/2129; G06F 21/44; G06K 19/07743; G06K 19/086; G06K 19/07733; H04L 9/3278
See application file for complete search history.

(56) References Cited

U.S. PATENT DOCUMENTS

| | | | |
|---|---|---|---|
| 4,894,563 A * | 1/1990 | Gudger | H03K 19/17716 326/38 |
| 9,350,330 B2 | 5/2016 | Simons et al. | |
| 10,438,190 B2 | 10/2019 | Wade et al. | |
| 10,462,110 B2 | 10/2019 | Peffers et al. | |
| 10,749,694 B2 | 8/2020 | Adams et al. | |
| 2015/0070048 A1 | 3/2015 | Gorman et al. | |
| 2017/0178710 A1 * | 6/2017 | Augustine | G11C 13/0059 |
| 2024/0056317 A1 * | 2/2024 | Gauthier | H04L 9/3236 |

OTHER PUBLICATIONS

International Search Report and Written Opinion mailed Oct. 23, 2024 in connection with International Application No. PCT/EP2024/065676.
Invitation to Pay Additional Fees mailed Sep. 2, 2024 in connection with International Application No. PCT/EP2024/065676.
Ehrenberg et al., IEEE Standard for Test Access Port and Boundary-Scan Architecture. IEEE Draft WGDS, Jun. 28, 2022;1149(1):1-449.
Office Action of TW Application No. 11420831240, dated Aug. 7, 2025, 8 pages.

* cited by examiner

*Primary Examiner* — Daniel D Chang
(74) *Attorney, Agent, or Firm* — DLA Piper LLP (US)

(57) ABSTRACT

This disclosure relates to electronic chip identifiers, ECIDs. In one example an electronic device is disclosed, which includes an identity unit configured to store an ECID that uniquely identifies the electronic chip, and a multi-purpose pin for use in outputting the ECID from the electronic device. The multi-purpose pin is also for a function of the electronic device that is unrelated to electronic chip identification. The identity unit is configured to output the ECID from the electronic device using the multi-purpose pin such that the electronic device can be uniquely identified using the multi-purpose pin.

19 Claims, 12 Drawing Sheets

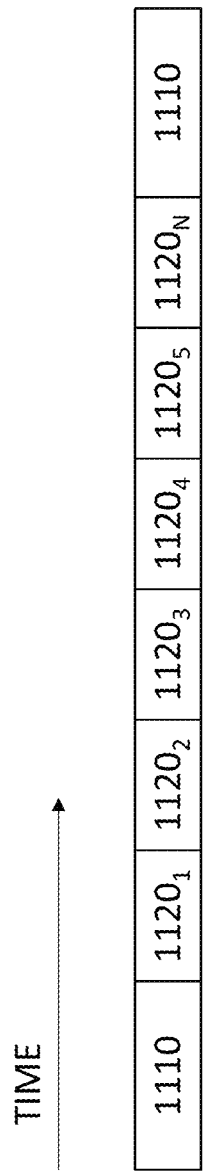
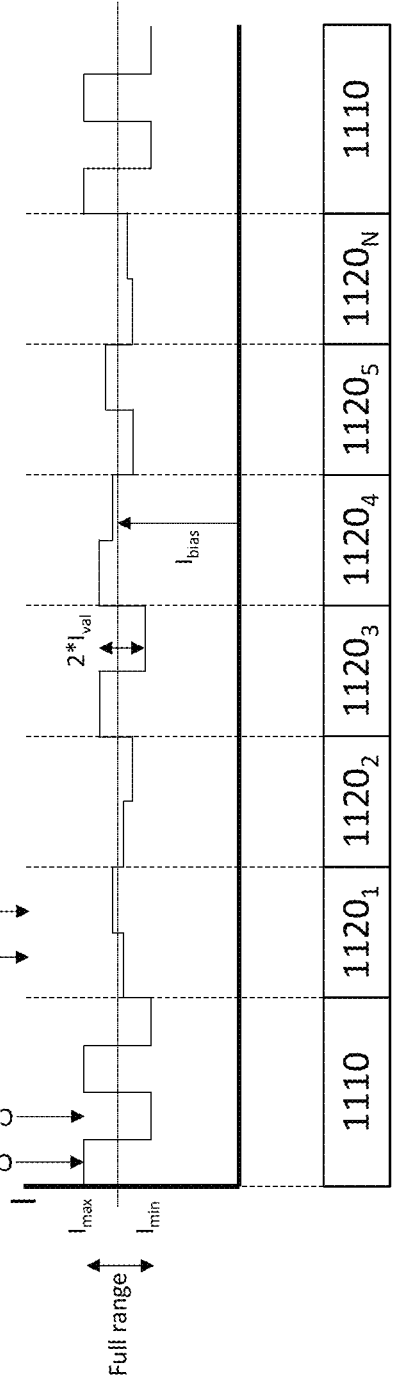

ELECTRONIC CHIP IDENTITY

TECHNICAL FIELD

The present disclosure relates to circuitry for inclusion in an electronic chip that enables the output of an electronic chip identifier, ECID, via a chip pin that has a primary purpose other than for the output of the ECID.

BACKGROUND

An Electronic Chip Identifier (ECID) uniquely identifies individual electronic chips or devices. It is different to a part or model number, which identifies the type or design of a chip/device, of which there may be many replicas (for example, 1000s or even millions of copies of the same chip/device). Instead, an ECID identifies each unique device such that each instance of a part or model may be uniquely identified.

There are many different uses and benefits for ECIDs. One purpose is for part identification. Another purpose is anti-counterfeiting. For example, if the ECID is stored within the device in a way that cannot be duplicated by counterfeiters (for example, if the ECID is held by a physically unclonable function within the device), then the ECID may be read off from the chip and then checked against an ECID database held, for example, by the manufacturer. If the ECID read out from the device can be found in the manufacturer's database, then the device is confirmed as authentic. If not, it may be counterfeit. Finally, another purpose of ECID is to help with failure analysis. If a device can be uniquely identified throughout its lifetime, its history may be traced for quality control purposes. For example, depending on the detail of records held by the manufacturer, the time, day and/or location of manufacture of the device may be traced. Potentially even the specific die position, wafer batch, etc, may be traced, as might details of the device calibration, such as the identity of the calibration operative, the location of calibration, etc.

However, for many devices it can be difficult if not impossible to store an ECID within the device and read it out. In some instances, the device will not have a digital interface, or will not have any available pins for reading out an ECID. For example, the device may be an all analog device, meaning that digital storage and readout of an ECID may not be possible. Even for devices that are partially or fully digital, the device may not include memory (such as non-volatile memory) and to include memory within a device purely for ECID storage purposes is likely to be too costly and/or complex to be worthwhile. Therefore, implementing an ECID is not straightforward for many different device types.

SUMMARY

In a first aspect of the disclosure, there is provided an electronic device comprising: an identity unit configured to store an electronic chip identifier, ECID, that uniquely identifies the electronic chip; and a multi-purpose pin coupled to the identity unit, wherein the multi-purpose pin is for use in outputting the ECID from the electronic device and for a function unrelated to electronic chip identification, wherein the identity unit is configured to output the ECID from the electronic device using the multi-purpose pin such that the electronic device can be uniquely identified using the multi-purpose pin.

In a second aspect of the disclosure, there is provided an electronic device comprising an identity circuit configured to store an electronic chip identifier, ECID, that uniquely identifies the electronic chip, wherein the identity unit is normally off but is configured to turn on and output the ECID from the electronic device upon detecting an ECID enable condition.

In a third aspect of the disclosure, there is provided an electronic device configured to store an electronic chip identifier, ECID, that uniquely identifies the electronic chip, wherein the electronic device comprises: a physically unclonable function, PUF, circuit for storing the ECID; and a readout unit for reading the ECID from the PUF circuit and outputting the ECID from the electronic device.

DRAWINGS

Aspects of the present disclosure are described, by way of example only, with reference to the following drawings, in which:

FIGS. 11 and 12 show an example sequence of analog signals output by the electronic device accordance to an aspect of the present disclosure.

DETAILED DESCRIPTION

Figure 1:
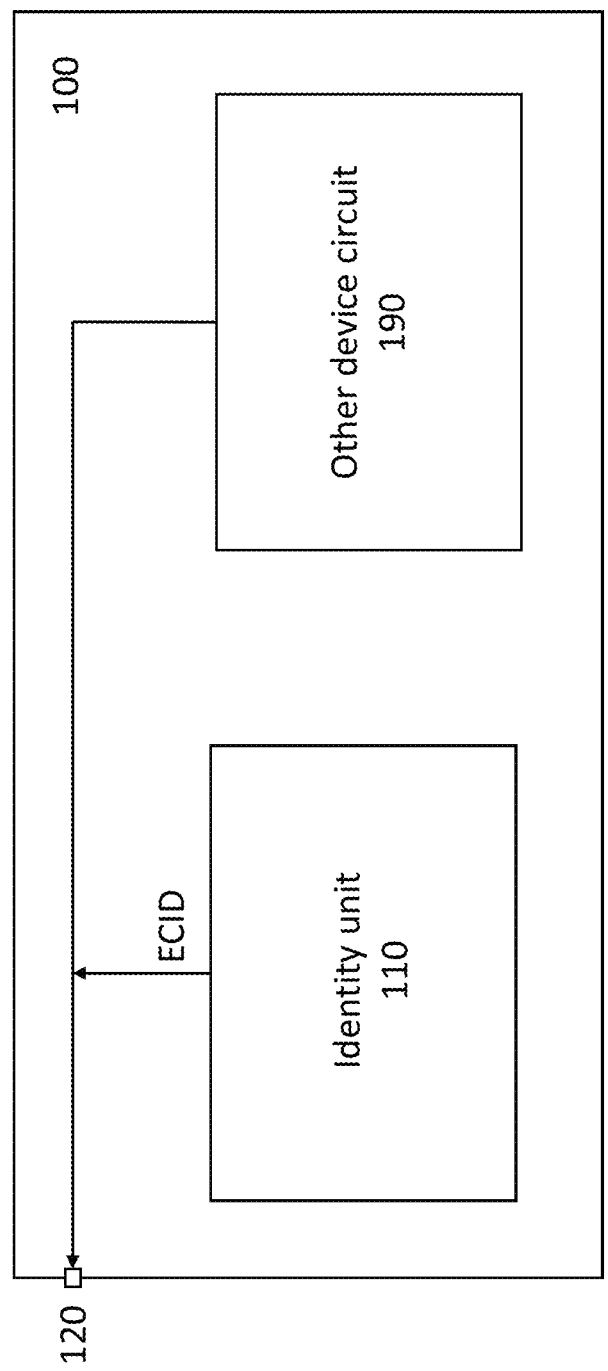
FIG. 1 shows an example schematic diagram of an electronic device in accordance with the present disclosure.

Electronic devices all typically have one or more pins (sometimes referred to as interconnects) to enable electrical connections to other electronic components or devices. For example, electronic devices may have two power supply pins and/or at least one signal input pin for use in inputting electrical signals to a circuit(s) within the electronic device and/or at least one signal output pin for use in outputting electrical signals from the circuit(s) within the electronic device. Often, every pin of the electronic device has a particular use in the operation of the electronic device and to include additional pins in the electronic device would incur additional cost and may also result in the electronic device needing to be larger.

The inventors have developed techniques where an electronic chip identifier, ECID, can be stored within the electronic device and read out from the electronic device using one of the existing pins that already serves a different purpose. For example, one of the power supply pins may be used to read out the ECID from the electronic device so that the device may be uniquely identified without requiring a dedicated ECID readout pin.

In more detail, the inventors have developed an identity unit that can be included in various different types of electronic device. The identity unit is designed to store an ECID that uniquely identifies the electronic device and is configured such that the ECID can be output from the electronic device using one of the electronic device's pins that also serves a different purpose that is unrelated to electronic chip identification (for example, one of the electronic device's power supply pins). The identity unit may store the ECID in any suitable way, for example digitally using memory that is already present in the electronic device or that is included within the identity unit, or in an analog fashion, for example using a physically unclonable function (PUF) circuit that is included in the identity unit. The identity unit can be configured to output the stored ECID in a digital format or an analog format, such that regardless of whether the electronic device is an all analog, or digital, or mixed analog-digital device, the identity unit can still operate within the electronic device and output the ECID. Furthermore, the identity unit may be configured to output the ECID to the chosen electronic device pin in a format that does not interfere with the other/main function of the pin. For example, if the chosen electronic device pin is a voltage power-supply pin for the electronic device, the identity unit may be configured to output the ECID as a current signal, so as to be distinguishable to the external circuit/device receiving the ECID and so as not to interfere with the voltage power-supply signal. Likewise, if the chosen electronic device pin is a current power-supply pin for the electronic device, the identity unit may be configured to output the ECID as a voltage signal, so as to be distinguishable to the external circuit/device receiving the ECID and so as not to interfere with the current power-supply signal.

Consequently, an extremely wide range of electronic devices may be enabled with ECID capabilities at relatively low cost by including the identity unit in the electronic device, and without requiring any redesign or modification to the other circuits and operations of the electronic device.

FIG. 1 shows an example schematic diagram of an electronic device 100 in accordance with the present disclosure. The electronic device 100 includes an identity unit 110 that is configured to store an ECID that uniquely identifies the electronic device 100, and a multi-purpose pin 120. The multi-purpose pin 120 is intended for use by some other circuit 190 of the electronic device 100, and is also used by the identity unit 110 to output the ECID so that an external device/circuit may receive the ECID using the multi-purpose pin 120. The other circuit 190 may be any analog and/or digital circuit or component within the electronic device 100. It may typically be one of the primary functions or circuits of the electronic device 100 (for example, if the electronic device 100 is a signal processor, the circuit 190 may be the signal processing circuitry). The identify unit 110 and the other circuit 190 may both be integrated within the same semiconductor die. Alternatively, they may each be formed within a separate semiconductor die and then co-packaged in a single chip to form the electronic device 100. In one example, the multi-purpose pin 120 may be a power-supply pin that is used to power the other circuit 190. Alternatively, the multi-purpose pin 120 may be an input and/or output for use by the other circuit 190 during its operation. The other circuit 190 shall not be described any further herein since it could be any electrical function/circuit and is not part of the innovative contribution or development of the present disclosure.

Signals at the multi-purpose pin 120 that are used for/by the non-identity related function(s) of the circuit 190 may be of a first electrical type, for example voltage signals or current signals. As explained in more detail later, the identity unit 110 may be configured to output the ECID using a signal of a second electrical type (for example, current or voltage) that is different to the first electrical type. For example, if the other circuit 190 uses the multipurpose pin 120 for receiving or outputting a voltage signal, the identity unit 110 may output the ECID as a current signal. Likewise, if the other circuit 190 uses the multipurpose pin 120 for receiving or outputting a current signal, the identity unit 110 may output the ECID as a voltage signal.

Figure 2:
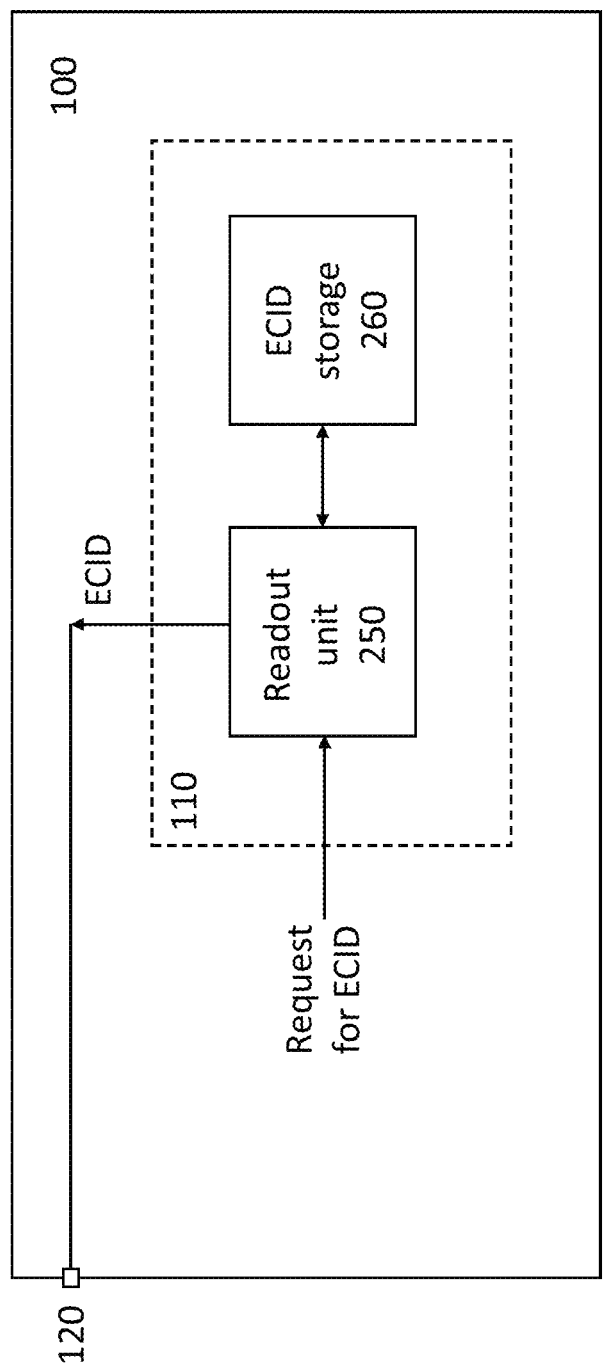
FIG. 2 shows an example schematic diagram representing additional details of the electronic device of FIG. 1.

FIG. 2 show an example schematic diagram of an aspect of the present disclosure. In this example, the identity unit 110 comprises a readout unit 250 and ECID storage 260. The readout unit 250 is configured to receive a request for ECID, which may come from a device or circuit external to the electronic device 110 and may be received by the electronic device 110 via any suitable pin, including the multi-purpose pin 120, as explained in more detail later. In response to a request for ECID, the readout unit 250 is configured to read the ECID that is stored in the ECID storage 260 and output the ECID to the multi-purpose pin 120 so that it may be received by the requesting circuit/device via the multi-purpose pin 120. In an alternative, the readout unit 250 may be configured not to receive requests for the ECID and instead periodically or intermittently read the ECID from ECID storage 260 and output it to the multi-purpose pin 120, such that any device/circuit wishing to know the ECID of the electronic device 100 may simply connect to the multi-purpose pin 120 and wait for the next output for the ECID.

The ECID storage 260 may be digital or analog storage. For example, it may be a digital memory unit, such volatile or non-volatile memory. Whilst it is represented in FIG. 2 as being part of the identity unit 110 and potentially dedicated to the identity unit 110, it may alternatively be a memory unit that is already part of the electronic device 100 (for example, part of the other circuit 190) and that the readout unit 250 has access to. In a further example, the ECID storage 260 may be configured to store the ECID in an analog format, for example using a physically unclonable function, PUF, circuit (as explained in more detail later).

Figure 3:
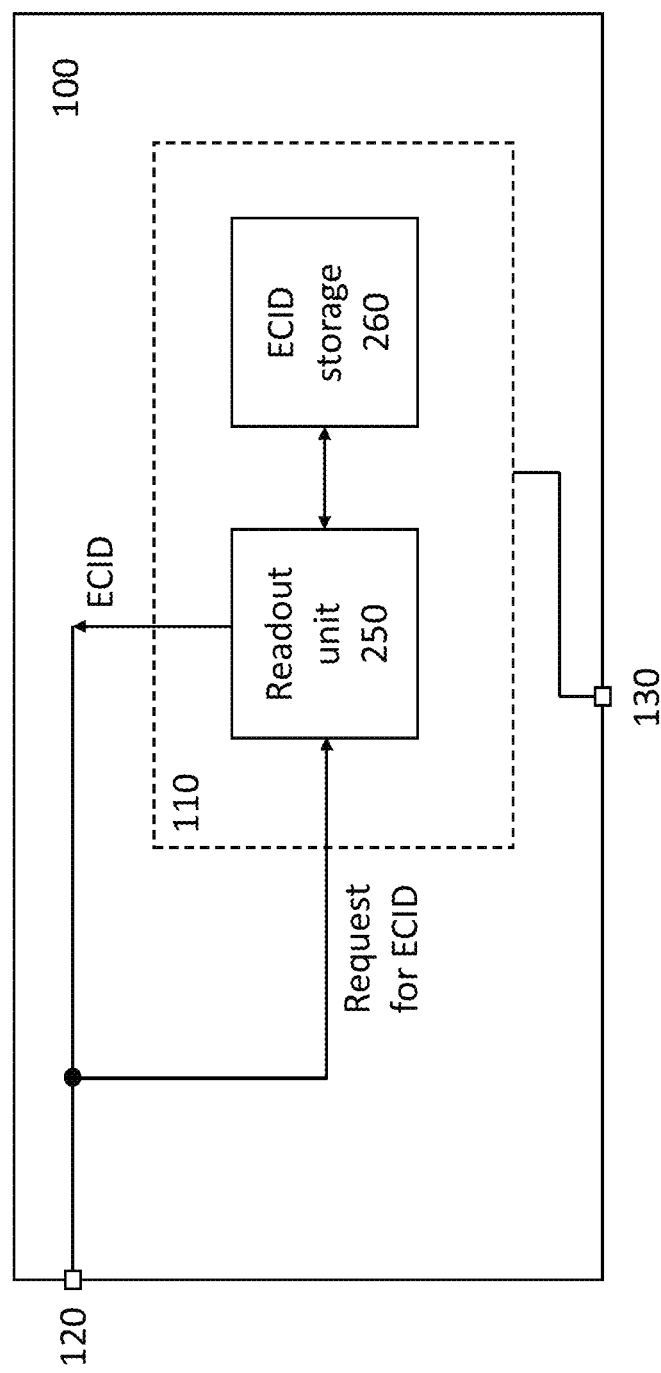
FIG. 3 shows an example schematic diagram representing additional details of the electronic device of FIG. 1.

FIG. 3 show a further example schematic diagram of an aspect of the present disclosure. In this example, the request for ECID is received by the identity unit 110 via the multi-purpose pin 120, in response to which the identity unit 110 may output the ECID to the multi-purpose pin 120, as explained above. In an alternative, the request for ECID may be received via a different pin, for example the second power supply pin 130, and the ECID then be output via the multi-purpose pin 120. Examples of the format of the request for the ECID are explained later in this disclosure.

In the example of FIG. 3, the multi-purpose pin 120 is a first power supply pin. The electronic device 100 comprises a second power supply pin 130 and the first and second power supply pins together form power interconnects for the electronic device 100. For example, the multi-purpose pin 120 may be a relatively high supply voltage, such as VDD, and the second power supply pin 130 may be a relatively low supply voltage, such as VSS (which may be a ground voltage or some other fixed reference voltage). In an alternative, the second power supply pin 130 may be a relatively high supply voltage, such as VDD, and the multi-purpose pin 120 may be a relatively low supply voltage, such as VSS (which may be a ground voltage or some other fixed reference voltage). The identity unit 110 and the other device circuit 190 (not shown in FIG. 3) may be coupled to the two power supply pins so as to power at least some of the circuitry in the identity unit 110 and the other device circuit 190, and also so that the identity unit 110 can receive the request for ECID.

Figure 4:
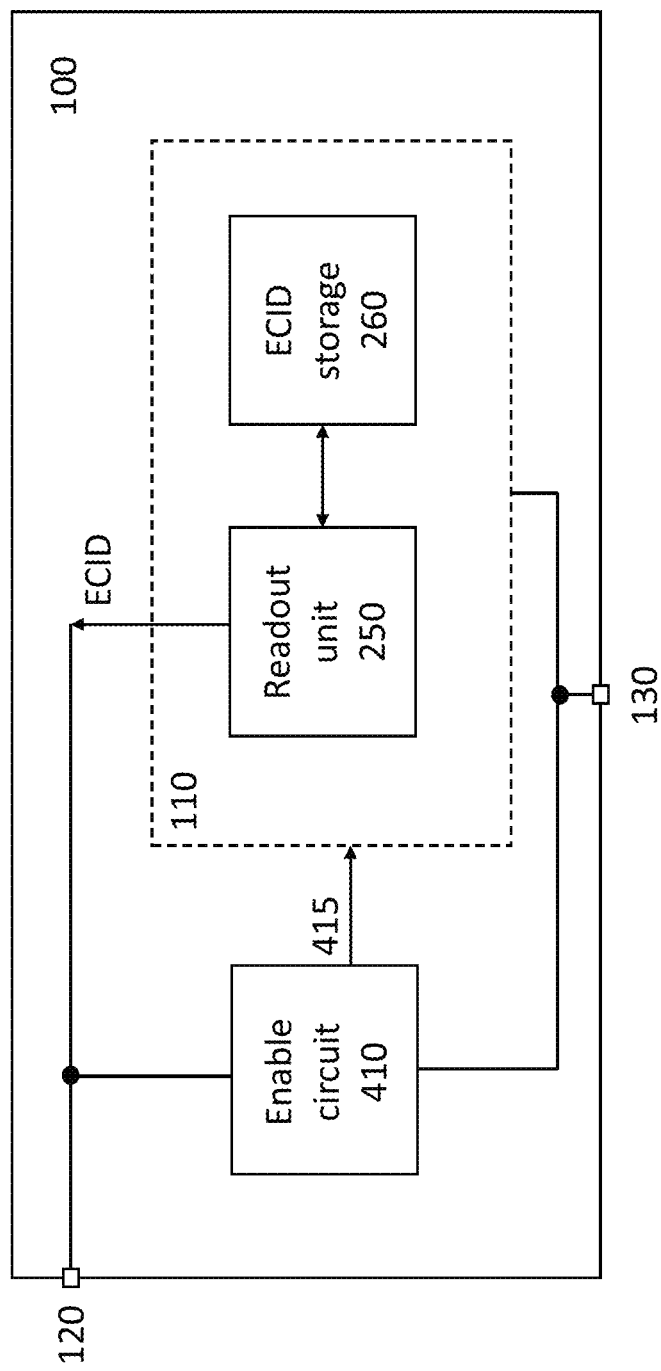
FIG. 4 shows an example schematic diagram representing additional details of the electronic device of FIG. 1.

FIG. 4 shows a variation of the implementation of FIG. 3 where the electronic device 100 comprises an enable circuit 410 coupled to the multi-purpose pin 120 and the second power supply pin 130. The enable circuit 140 may be configured to monitor for an ECID enable condition, such as a request for ECID, on at least one pin of the electronic device 100. In this particular example, the enable circuit 410 is coupled to the multi-purpose pin 120, which in this example is a power supply pin, and the second power supply pin 130, and it monitors for an ECID enable condition on either or both of those pins. However, it may alternatively be coupled to any suitable pin of the electronic device 100 and monitor for an ECID enable condition on that pin.

When the enable circuit 410 detects an ECID enable condition, it may output an activation signal 415 to the identity unit 110 so as to activate the identity unit 110 to output the ECID. For example, the activation signal 415 may be a power signal to the readout unit 250, which may power up the readout unit 250, causing it to read the ECID from the ECID storage 260 and output the ECID. However, the activation signal 415 may take any suitable form and activate the readout unit 110 in any suitable way. By using an enable circuit 410, the readout unit 250 may be configured to be normally off or dormant, such that it only draws power when an ECID is required. In this way, the identity unit 110 may add a minimal additional power consumption and heat generation to the electronic device 100, and have minimal effect or interference on the rest of the electronic device 100 (such as the other circuit 190). In an alternative, the enable circuit 410 may form part of the identity unit 110 and may be configured to activate other circuits within the identity unit 110 that are responsible for reading and outputting the ECID. In a further alternative, as mentioned earlier, the identity unit 110 may be configured to periodically read and output the ECID. For example, the enable circuit 410 may not be configured to monitor for an ECID enable condition, but instead may be configured periodically to output the activation signal 415 to the identity unit 110 (which is normally off or dormant whenever the activation signal 415 is not received).

In the examples where the enable circuit 410 monitors for an ECID enable condition, the ECID enable condition may be an electrical signal having a predetermined characteristic. The electrical signal may be any suitable electrical signal that can be received via one or more pins of the electronic device 100 and the predetermined characteristic may be any suitable characteristic that the electrical signal can reliably be given and that the enable circuit 410 can reliably detect.

Figure 5:
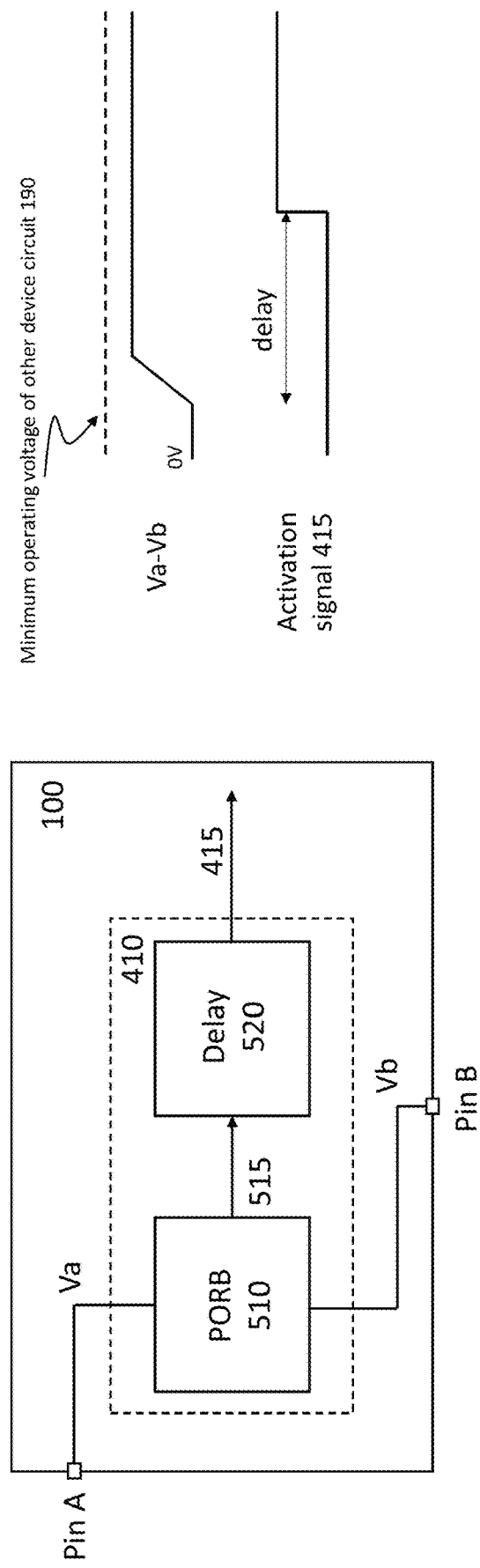
FIG. 5 shows an example schematic diagram representing additional details of the enable circuit of FIG. 4.

FIG. 5 shows an example implementation of the enable circuit 410. In this example, enable circuit 410 is configured to monitor the power supply signal received by the electronic device 100 via the power supply pins—'Pin A' and 'Pin B'—of the electronic device 110. In one example, the multi-purpose pin 120 using which the ECID is output may be 'Pin A' or 'Pin B', for example as shown in FIG. 4. However, in an alternative, the enable circuit 410 may monitor the power supply signal received at the power supply pins, and the multi-purpose pin 120 to which the identity unit 110 outputs the ECID may be some other pin of the electronic device 100.

The predetermined characteristic may be a predetermined power supply voltage, i.e. a particular voltage different between the voltage, Va, on Pin A and the voltage, Vb, on Pin B. For example, it may be a non-zero voltage that is outside of the normal operating voltage for the supply to the electronic device 100. In this example, the other device circuit 190 may require a supply voltage (eg, Va-Vb) of between 4 to 8V, such that the normal operating voltage of the electronic device 100 is between 4 to 8V, such as 5V. The enable circuit 410 may be configured to monitor the supply voltage and if it is held, for a predetermined period of time, at a voltage outside of the normal operating voltage range, for example held at voltage that is below the normal operating voltage range, such as 3V, or at a voltage that is greater than the normal operating voltage range, such as 10V, the ECID enable condition is met. This may be achieved, as a non-limiting example, by including a Reverse Power on Reset, PORB, circuit 510 and a delay circuit 520. The skilled person will readily understand how to implement a PORB circuit 510 configured to output a signal 515 when the voltage Va-Vb is outside of a predetermined range. As such, for the sake of simplicity, details of that circuit shall not be disclosed herein. The delay circuit 515 is configured to receive the signal 515 from the PORB circuit 510 when the voltage Va-Vb is outside of the predetermined range, and output the activation signal 415 when the signal 515 is continuously received for a predetermined period of time, for example 1 second, or 2 seconds, or 3 seconds, etc. In this way, accidental activation of the identity unit 110 may be avoided. An example signal diagram is included on the righthand side of FIG. 5, which shows the voltage Va-Vb being increased from 0V to a non-zero voltage that is held below the minimum operating voltage of the other device circuit 190. After being held at that voltage for a predetermined period of time—'delay'—the activation signal 415 is output from the enable circuit 410.

In an alternative, the enable circuit may be configured to monitor for a predetermined characteristic that is something other than a particular voltage level held for a particular period of time. For example, it may be configured to monitor for a predetermined modulated code, such as a predetermined pattern of voltage pulses modulated onto the voltage supply signal (or onto any other signal received by the electronic device 100), for example using amplitude modulation, or frequency modulation, or by turning the monitored signal on and off to create the pulses.

Figure 6:
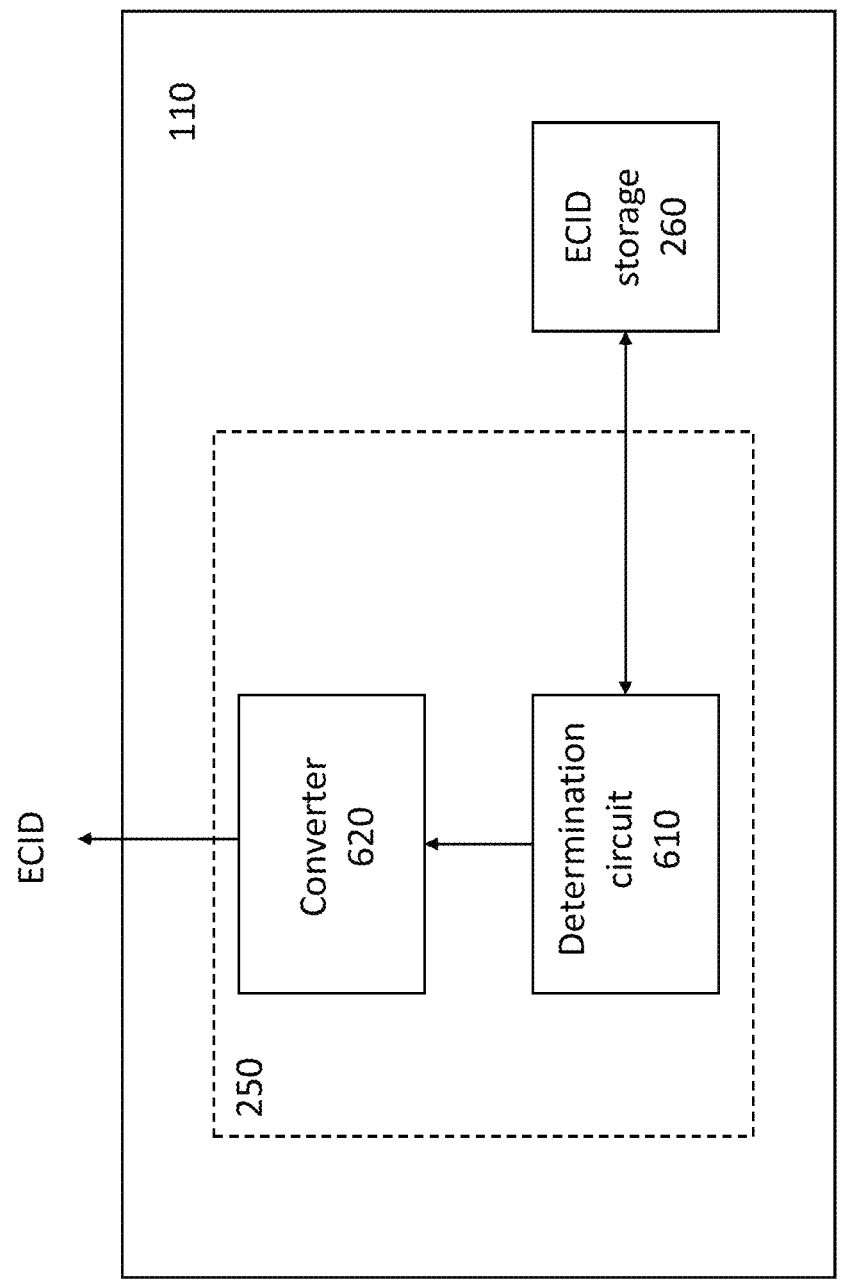
FIG. 6 shows an example schematic diagram representing additional details of the readout unit of FIGS. 2 to 4.

FIG. 6 shows some further details of an example implementation of the readout unit 250. In this example, the readout unit 250 comprises a determination circuit 610 that is configured to determine the ECID using the ECID storage 260, and a converter circuit 620. In this example, signals at the multi-purpose pin 120 that are used for/by the circuit 190 are of a first electrical type. For example, the signals may be voltage signals, such as a voltage power supply signal (as is the case in the examples of FIGS. 3 to 5). The determination circuit 610 is configured to determine the ECID as a signal of the first electrical type, for example as a voltage signal. In one example, the ECID storage 260 may be a memory unit and the determination circuit 610 may read the ECID from the ECID storage as a voltage (for example, the ECID may be a serial or parallel digital voltage signal). In another example, described in more detail later, the ECID storage may be a PUF unit and the determination circuit 610 may be configured to use the PUF unit to determine the ECID as a voltage signal. The determined ECID is then converted from a signal of the first electrical type (for example, a voltage signal) to a signal of the second electrical type (for example, a current signal) by the converter 620. The signal converter 620 then outputs the ECID as a signal of the second electrical type so that it may be detected at the multi-purpose pin 120. In one example the first electrical signal is a voltage signal and the second electrical signal is a current signal. In another example the first electrical signal is a current signal and the second electrical signal is a voltage signal.

In the example of the ECID storage 260 comprising a PUF unit, the determination unit 610 may use the PUF unit to determine the ECID as a series of analog values, each analog value representing one bit of the ECID. The readout unit 250 may then either output the ECID to the multi-purpose pin 120 as a series of analog values, or it may be configured to convert the analog values to digital values and output the ECID to the multi-purpose pin 120 as a series of digital values. Each of these alternatives are described in more detail below.

Figure 7:
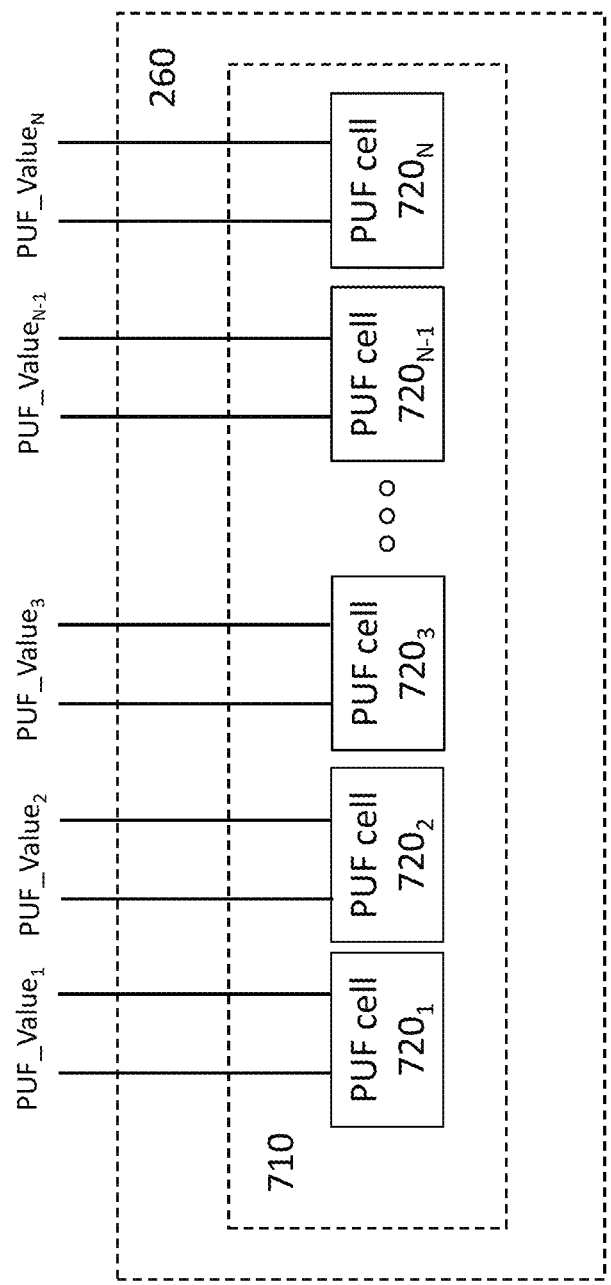
FIG. 7 shows an example schematic diagram representing additional details of the ECID storage unit of FIGS. 2 to 4 and 6.

FIG. 7 shows an example of the ECID storage 260 comprising a PUF unit 710. The PUF unit 710 comprises a plurality of pairs of matched devices or components. In this particular example, it comprises a plurality of PUF cells 720$_n$, each of which has a pair of matched devices or components. As the skilled person will understand, PUFs store a value by making use of random manufacturing differences between the matched pairs of devices/components. For example, each PUF cell 720$_n$ may comprise a pair of transistors that are identical by design, but will have slightly different electrical properties as a result of random manufacturing variances. For example, the turn-on threshold, or the on-state resistance, etc of each of the transistors making up the pair will be slightly different. That difference will be random for each PUF cells 720$_n$, so for some PUF cells 720$_n$ the difference will be a positive value and for other PUF cells 720$_2$ it will be a negative. The difference may be read off from each PUF cell 720$_n$ as an analog signal 'PUF_Value$_n$', which may be either a voltage signal or a current signal depending on the components/devices making up the PUF cells 720$_2$. If the PUF_Value$_n$ for a cell is a positive value, that may indicate a '1' (or '0') and if it is a negative value, that may indicate a '0' (or '1'). As a result, it can be seen that the PUF unit 710 can store a multi-bit random, but persistent (i.e., it should not change over time since the random manufacturing variances of the components that create the PUF values should not change over time), value that can serve as the ECID.

Whilst an example is given above of each PUF cell 720$_n$ comprising a matched pair of transistors, in an alternative any suitable matched pairs of components/devices may be used. For example, each PUF cell may comprise a matched pair of capacitors, with the PUF value of the cell being a measure of the difference in capacitance. Alternatively, they may each comprise a matched pair of resistors, with the PUF value of the cell being a measure of the difference in resistance. Alternatively, they may each comprise an H-bridge of resistors (eg, made up of a pair of matched potential dividers), with the PUF value of each cell being a measure of the difference in resistance between the two sides of the H-bridge. Alternatively, they may each comprise a pair of oscillators, with the PUF value of each cell being a measure of the difference in oscillator frequencies, etc, etc.

Furthermore, whilst in this example the PUF unit 710 comprises a plurality of fixed PUF cells 720$_n$, in an alternative the PUF unit 710 may comprise a plurality of components/devices that are all of the same design and that may be dynamically paired up (for example, by the determination unit 610) with a PUF value read from each pair by the determination unit 610.

In one example implementation, the converter 620 may comprise an analog to digital converter, ADC, configured to receive, in serial, each analog PUF value that is determined by the determination unit and output a digital conversion. The ADC may be, for example, a 1-bit converter or quantiser and convert positive PUF values to 1 and negative PUF values to 0 (or −1). In an alternative, the ADC may be a multi-bit converter and output a multibit digital conversion of each PUF value that is indicative of both the sign and the magnitude of the converted analog PUF value. Any suitable type of ADC may be used, for example a slope converter, SAR converter, sigma-delta converter, pipeline converter, flash converter, etc.

The converter 620 may be configured to output the converted digital values as a digital bitstream or using pulse width modulation (PWM). In this way, the PUF unit 710 can store the ECID as a plurality of analog PUF values which can be readout by the determination circuit 610 and converted into a series of digital values that represent the ECID. The series of digital values may be output by the converter 620 as a different electrical signal type to that used for/by the circuit 190. For example, if the multi-purpose pin 120 is a supply voltage pin, the converter 620 may be configured to output the digital values as current values, for example using a positive current to represent a digital '1' and a zero current (or a negative current) to represent a digital '0'. In this case, the converter 620 may comprise not only an ADC, but may also comprise a signal type converter, such as a voltage to current converter, or a current to voltage converter.

In an alternative, the readout unit 250 may be configured to output the ECID to the multi-purpose pin 120 as a series of analog values. For example, each analog PUF value readout from the PUF unit 710 by the determination circuit 610 may be consecutively, or serially, output by the readout unit 250 onto the multi-purpose pin 120. Those analog values may then be digitally converted by an off-chip ADC (i.e., by an ADC that is not part of the electric device 100, but that is coupled to the multipurpose pin 120 in order to receive the analog values). A benefit of outputting the ECID in analog form for digital conversion outside of the electronic device 100 is that some electronic devices 100 are not digital devices and so do not have digital interfaces on their pins. Consequently, being able to implement the identity unit 110 (and also the enable circuit 410, if there is one) entirely in analog circuitry may increase the flexibility of the unit and make it possible to include in a wider variety of different electronic devices 100. Furthermore, fraudulently replicating an ECID as a series of analog values is typically harder than a digital ECID value. As such, outputting the ECID in analog may also reduce the ability of adverse actors to clone the identity unit 110.

In this alternative where the ECID is output as a series of analog values, the converter 620 may be configured to change the electrical signal type of the analog values before being output to the multi-purpose pin 120, for example it may comprise a V-to-I converter or an I-to-V converter. In some implementations, one of which is described in more detail below, the determination circuit 610 may be stimulated and powered in part by the primary signal applied to the multi-purpose pin 120, for example a voltage and current power supply signal. The determination circuit 610 and PUF unit 710 may therefore operate using signals of that electrical type (i.e., voltage or current) and generate the ECID as a series of analog values of that electrical type (i.e., voltage or current). So as to output those analog values to the multi-purpose pin 120 in a way that an external device, which is coupled to the multi-purpose pin 120, may reliably recover and digitally convert the analog values, the converter 620 converts the analog values to analog signals of a different type to that of the primary signal applied to the multi-purpose pin 120 (for example, convert to a current or voltage).

If the determination circuit 610 and PUF unit 710 operate using current signals and generate the ECID as a series of analog current values, the converter 620 may comprise an I-to-V converter. The determination circuit 610 may consecutively or serially output the series of current values to the converter 620, which may convert them to a series of voltage values that are output consecutively or serially to the multi-purpose pin 120. Any suitable I-to-V converter may be used, for example a transimpedance amplifier.

If the determination circuit 610 and PUF unit 710 operate using voltage signals and generate the ECID as a series of analog voltage values, the converter 620 may be a V-to-I converter. The determination circuit 610 may consecutively or serially output the series of voltage values to the converter 620, which may convert them to a series of current values that are output consecutively or serially to the multi-purpose pin 120. Any suitable V-to-I converter may be used, for example a transconductance amplifier.

Figure 8:
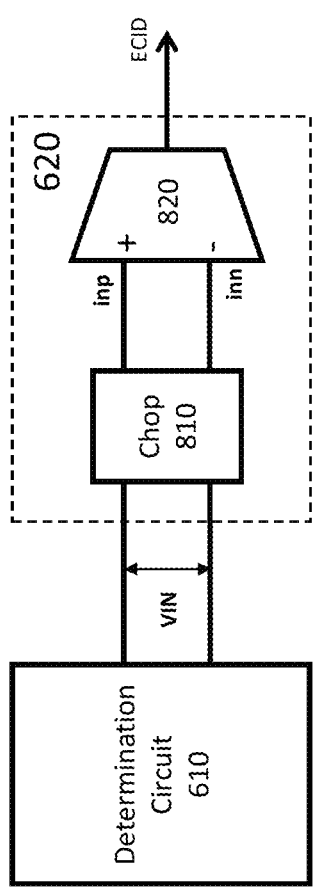
FIG. 8 shows an example schematic diagram representing additional details of the readout unit of FIG. 6.

FIG. 8 shows an example of one type of V-to-I converter that may be used for the converter 620—an operational transconductance amplifier. In this example, the converter 620 comprises a chop circuit 810 and a transconductance amplifier 820. VIN is a differential analog voltage input, which may be any one of PUF_Value$_n$ described earlier (for example, the determination circuit 610 may serially couple each of the analog values PUF_Value$_n$ to the input of the converter 620). The chop circuit 810 is optional, but when it is included it is used to switch the coupling of VIN to the inputs of the transconductance amplifier 820. As will be understood by the skilled person, the chop circuit 810 may comprise switches to change the coupling of VIN to the inputs of the transconductance amplifier 820 such that when the circuit is activated, or chopped, coupling of VIN to the inputs of the transconductance amplifier 820 switches over, so that the signal previously coupled to inp is now coupled to inn, and the signal previously coupled to inn is now coupled to inp. This is to help reduce or eliminate errors caused by systematic offsets in the transconductance amplifier 820, as explained later. The ECID signal output from the transconductance amplifier 820 will comprise two components: Ibias and Ival. Ibias is the steady bias current of the transconductance amplifier 820. Ival is the analog ECID value that is the conversion of VIN and may be positive or negative depending on the polarity of VIN. Therefore, as each different analog voltage PUF_Value$_n$ is applied to the input of the converter 620, the value of Ival should change in dependence on the value of the input PUF_Value$_n$. A circuit/chip external to the electronic device 100 may detect/extract the component Ival and digitally convert the series of analog values to arrive at a digital ECID.

Figure 9:
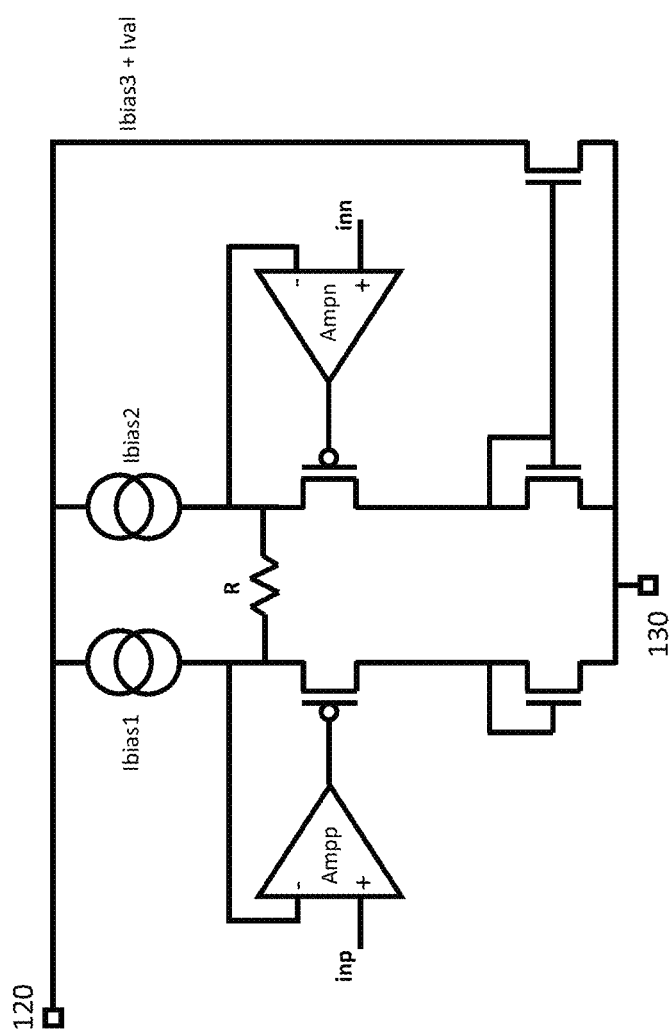
FIG. 9 shows an example schematic diagram of an implementation of a transconductance amplifier.

FIG. 9 shows one particular example implementation of the transconductance amplifier 820, although it will be appreciated that the transconductance amplifier 820 may be implemented in any suitable way. The amplifiers Ampp and Ampn are optional. In this example, the value of Ibias described above is made up of Ibias1+Ibias2+Ibias3+I_Ampp+IAmpn. The V-to-I conversion factor G (which defines any gain applied to Ival when converting from Vin to Ival) of the transconductance amplifier 820 may be equal to 1/R.

Figure 10:
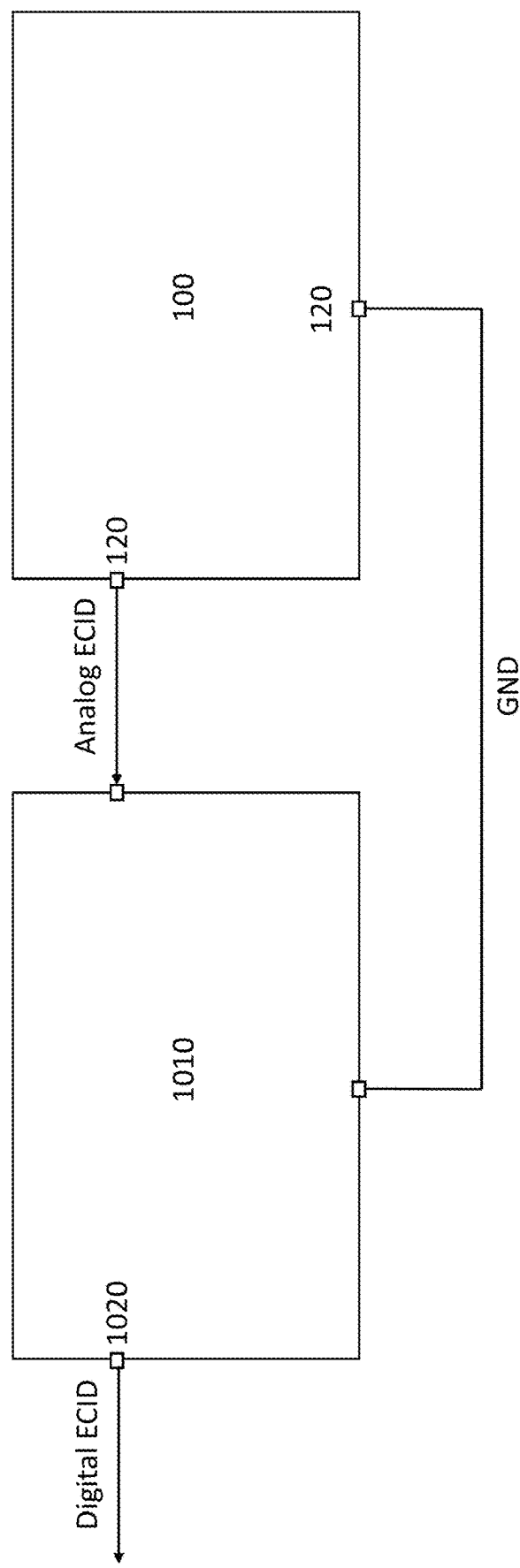
FIG. 10 shows an example schematic diagram representing a coupling between an electronic device according to an aspect of the present disclosure and an external ADC.

FIG. 10 shows an example of a coupling between the electronic device 100 and an external device 1010 that comprises an ADC, when the identity unit 110 is configured to output the ECID as a series of analog signals (either voltage or current signals). As can be seen, the electronic device 100 and the external device 1010 are both coupled to a common reference voltage, in this case ground or VSS, although any other reference may be used. Optionally, if the analog ECID at the multi-purpose pin 120 is a current signal, the external device 1010 may comprise an I-to-V converter, such as a transimpedance amplifier, to sense the current signal and feed it to the digital converter as a voltage signal. The external device comprises an ADC 1010 that digitally converts the analog ECID and in this example, outputs the digital ECID from from pin 1020.

When the ECID is output by the readout unit 250 as a series of analog values (either current or voltage), the readout unit 250 may optionally be configured to output additional data to assist the external device 1010 in accurately converting the analog values. The additional data may be referred to as training data that defines the full scale of the analog ECID values, for example the full scale that is possible for each analog value determined from the PUF unit 710. Training data may be applied by the readout unit 250 to the multi-purpose pin before and/or after the series of ECID analog values. In this way, any shift or drift in the analog ECID values, for example caused by device aging, may be addressed because the training data should also shift or drift by a similar amount, so the analog values may be accurately understood relative to the full scale value in the training data. The size of the analog values relative to the full scale value should not significantly change over time since the analog values and the full scale value should all shift or drift by a similar amount. In particular, as explained later, the full scale may be generated using a reference that is made up of the same type of technology/components in the PUF unit 710, such that they experience similar changes over time.

FIG. 11 shows an example sequence of analog signals that the readout unit 250 may be configured to output to the multi-purpose pin 120. In this example, training data 1110 starts and ends the signal sequence, but in an alternative it may be included only at the start or only at the end. After outputting the first set of training data 1110, the readout unit 250 serially outputs each of the analog ECID values 1120$_n$, each corresponding to a bit of the ECID. For example, each analog value 1120$_n$ may correspond to a PUF_Value$_n$ that is read from the PUF unit 710.

FIG. 12 shows a visualisation of the analog signals that are output by the readout unit 250. In this example, the output signals are current signals, but they may alternatively be voltage signals (for example when the primary signals on the multi-purpose pin 120—i.e., the signals for/used by the other device circuit 190—are current signals). In this example, the converter 620 includes a chop circuit 810, as described earlier with reference to FIG. 8. During the training data phase 1110, the determination circuit 610 may set VIN to be equal to the maximum voltage $V_{max}$-$V_{min}$ that the ECID differential analog voltages could be. It may obtain this voltage in any suitable way, for example by reading it out from the PUF unit 710 as described later. Initially the chop circuit 810 is in state 0 such that the V-to-I converter converts $V_{max}$-$V_{min}$ to generate the value $I_{max}$, which is equal to $G*(V_{max}-V_{min})$. The current output to the multi-purpose pin 120 at this time is $I_{bias}$+$I_{max}$. The chop circuit 810 is then chopped to put it in state 1 where the connections of VIN to the V-to-I converter 820 are switched over. As a result, the minimum voltage $V_{min}-V_{max}$ is at the input to the V-to-I converter, such that it then generates the value $I_{min}$, which is equal to $G*(V_{min}-V_{max})$. The current output to the multi-purpose pin 120 at this time is $I_{bias}+I_{min}$. By subtracting one from the other, the systematic component $I_{bias}$ can be removed (and any other systematic offset that the V-to-I converter 820 has) to find $I_{max}-I_{min}$, which defines the full scale of the analog signals it will receive to convert. In the example of FIG. 12, this process is repeated so that two separate instances of $I_{max}$ and $I_{min}$ are output to the multi-purpose pin 120, however it may be repeated any number of times during the training phase 1110, or not repeated at all. Once the predetermined number of training signals has been generated and output, the determination circuit 610 may be configured to move on to the ECID output phase and start outputting the analog ECID signals $1120_n$. The external device 1110 may be configured to expect the predetermined number of training signals so that it can learn the full scale and know when the readout unit 250 has moved on to the analog ECID signals $1120_n$.

Two analog currents are output for each analog value $1120_n$. The first is with the chop circuit 810 in state 0 and the other is with the chop circuit in state 1. The difference between these two analog currents is equal to $2*I_{val}$, where $I_{val}=G*V_{val}$ ($V_{val}$ being the analog ECID voltage that is determined by the determination circuit 610 and applied to the converter 620 input, such as PUF_Value$_n$). As a result, if for analog value $1120_1$ VIN is set to PUF_Value$_1$, during chop 0 the output current is equal to $I_{bias}+I_{val}$, where $I_{val}=G*$PUF_Value$_1$. During chop 1 the output current is equal to $I_{bias}-I_{val}$. Consequently, subtracting one from the other finds the difference between the two analog currents, which is equal to $2*I_{val}$.

Consequently, the external device 1010 may be configured to digitally convert the difference between the two analog values in order to generate a digital value that is indicative of 2*Ival (which is in turn dependent on the PUF_value$_1$). Alternatively, where a full scale value is available, the external device 1010 may be configured to digitally convert the difference between the two analog values relative to the full scale, for example digitally convert 2*Ival/fullscale, in order to generate the digital value. In both cases, systematic bias and offset of the V-to-I converter 620 may be reduced or cancelled as a result of finding the difference between the two analog values and an accurate ECID digital value may be arrived at. This process is repeated for each of the ECID analog values such that after completing the analog value $1120_N$, an N bit digital ECID should have been arrived at by the external device 1010.

If the determination of PUF_Value$_n$ is perfect, the two signal levels for each analog value $1120_n$ should be perfectly centred around the mid-point between $I_{max}$ and $I_{min}$. FIG. 12 shows that sometimes they are not centred around the mid-point, which is a result of errors or imperfections in the measurement of the random manufacturing differences between the components/devices in the PUF cell $720_n$. However, these errors should be essentially eliminated as a result of the chop process employed, since the analog value converted by the external device 1010 is the difference between the two analog signals (i.e., 2*Ival), so only the relative size, rather than the absolute size, of the two analog signals matters.

Figure 13:
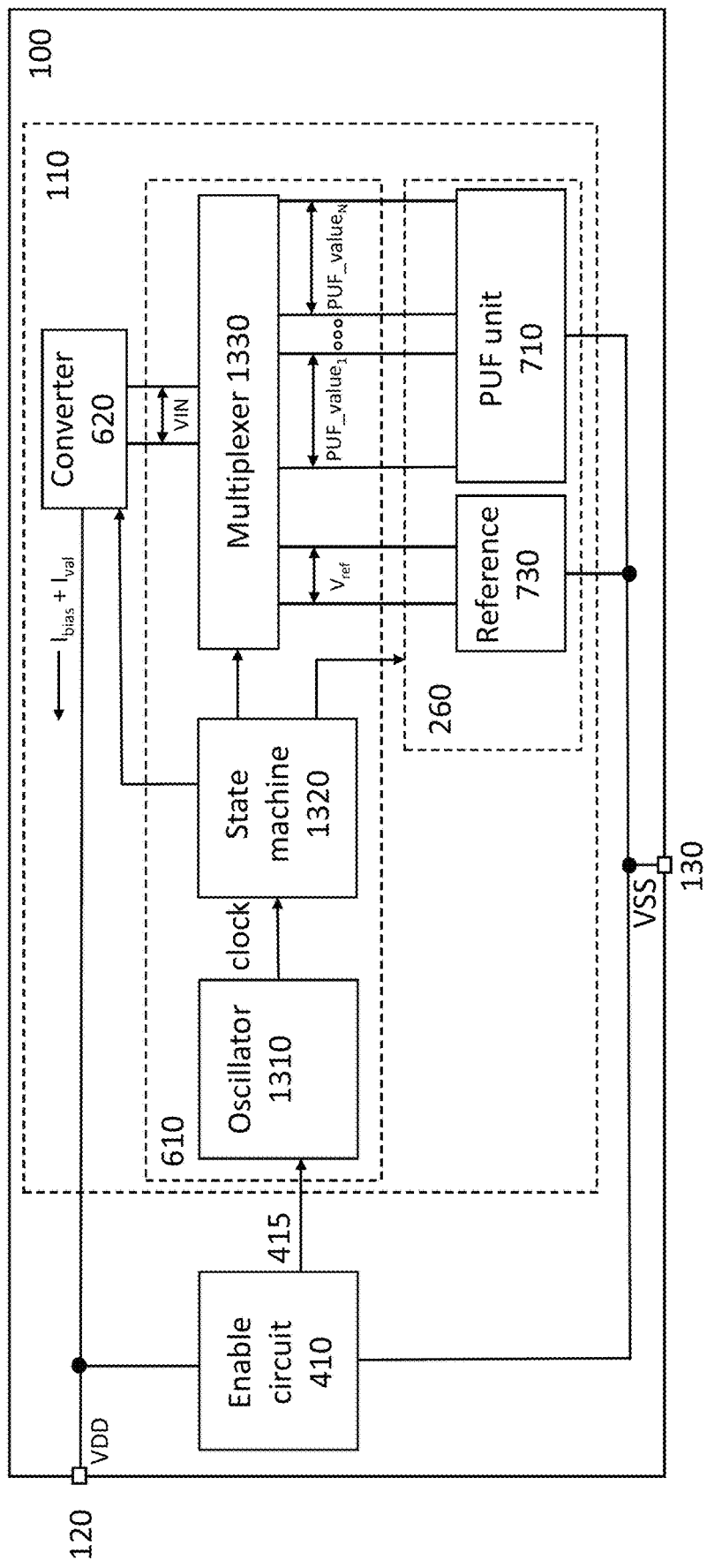
FIG. 13 shows an example schematic diagram representing details of an example implementation of the electronic device according to the present disclosure.

FIG. 13 shows an example detailed implementation of the identity unit 110 that brings together the various different optional features described above. In this example, the multi-purpose pin 120 is a first voltage supply pin (specifically a higher voltage supply pin, VDD) and the second pin 130 is a second voltage supply pin (specifically a lower voltage supply pin, VSS, which may be ground), with the two together making up the power supply to the electronic device 100. In an alternative, the multi-purpose pin 120 could be VSS and the second pin 130 could be VDD. In a further alternative, the multi-purpose pin 120 and the second pin 130 could together make up a current supply to the electronic device 100.

In this example implementation, the determination circuit 610 comprises an oscillator 1310 and a state machine 1320. The oscillator 1310 is configured to generate a clock signal that is used by the state machine to control the timing of its control of the multiplexer 1330. In this example, the activation signal 415 acts as a voltage supply signal to the oscillator 1310 (for example, when the enable circuit 410 has detected the enable condition, it may pass the signal VSS through as the activation signal 415). Alternatively, the activation signal 415 may simply be a conventional enable signal for the oscillator 1310. Consequently, in either case, the oscillator 1310 (and by extension the state machine 1320 and multiplexer 1330) is ordinarily inactive and not consuming power and only consumes power when the enable condition has been detected. The state machine 1320 is configured, upon receipt of the clock signal, to output predetermined control signals to the multiplexer 1330, converter 620 and ECID storage 260. In particular, whilst receiving the clock signal, it may output an activation/stimulation signal to cause the PUF unit 710 to output the voltages PUF_value$_1$. For example, if each PUF cell $720_n$ comprises an H-bridge of resistors, the state machine 1320 may output a voltage to be applied across the bridge, with the output PUF_value$_n$ being the differential voltage across the centre of the H-bridge. In this example, the ECID storage 260 also comprises a reference 730 that is configured to output $V_{ref}$, which is to be equal to the maximum voltage $V_{max}-V_{min}$ that the outputs of the PUF unit 710, PUF_value$_n$, are expected to take, so that the full scale of the analog values may be determined (which, as explained earlier, may then be used as part of the determination of the ECID, specifically as a reference against which the readout PUF values may be compared in order to remove the effect of any drift in the readout PUF values over time). The reference 730 may comprise any suitable circuitry, for example it may be identical to the circuit in each PUF cell $720_n$, except that the values of the components/devices may not be matched and may instead be deliberately different by an amount equal to or greater than the maximum expected random manufacturing difference between the devices in each PUF cell $720_n$. In this example, the size of $V_{ref}$ should be the same as, or greater than, the maximum size of each of PUF_value$_n$. As explained earlier, because the full scale value, i.e. $I_{max}-I_{min}$, is based $V_{ref}$ generated by the reference 730, any shift or drift in the analog values PUF_value$_n$ caused by component aging in the PUF unit 710 should also be reflected in a similar shift or drift in $V_{ref}$ as a result of corresponding component aging in reference 730. Therefore, any external device (such as device 1010) receiving the ECID output at the multipurpose pin 120 may consider the output analog PUF values relative to the full scale $I_{max}-I_{min}$, for example digitally converting a values based on the analog PUF value and the full scale, such as the ratio of the two, in order to recover the digital ECID, and so should still recover the correct ECID even in the event of component/device aging.

The control signal output to the multiplexer 1330 controls the timing of multiplexing the inputs, $V_{ref}$ and PUF_value$_n$, to the output VIN so that the input signals are serially applied to the converter 620 input, as described earlier with reference to FIGS. 11 and 12. The control signal output to the converter 620 controls the timing of the chop circuit 810, as described earlier with reference to FIG. 12. Consequently, the state machine 1320 controls the operational processes of the determination circuit 610 and the converter 620 so that the training data 1110 and series of analog ECID values 1120$_n$ are output from the identity unit 110 as analog current signals $I_{bias}+I_{val}$.

The skilled person will readily appreciate that various alterations or modifications may be made to the above described aspects of the disclosure without departing from the scope of the disclosure.

For example, it will be appreciated that FIG. 13 is simply one non-limiting implementation of the identity unit 110 that has an ECID storage 260 comprising a PUF unit 710 and various alternatives are possible. For example, the oscillator 1310 may be omitted and the state machine 1320 may instead receive a clock signal from a clock located elsewhere on the electronic device 100, in which case the activation signal 415 may be applied to the state machine 1320 to initiate its operation. The state machine 1320 may be implemented in any suitable way, for example as pre-programed logic, for example an FPGA, or it may be a microcontroller configured to output the control signals with predetermined timings based on the clock, or a microprocessor executing programmed instructions configured to cause it to output the control signals with predetermined timings based on the clock, etc. In a further alternative, the PUF unit 710 may not be configured to output simultaneously all of the plurality of signals PUF_value$_n$. Instead, the state machine 1320 may selectively activate/stimulate the reference 730 or individual PUF cells 720$_n$ so only one PUF_value$_n$ or $V_{ref}$ is output, in which case the multiplexer 1330 may be omitted. In a further alternative, where the PUF unit 710 does not comprise a plurality of PUF cells 720$_n$, the state machine 1320 may select which of the matched devices/components in the PUF unit 710 should be selected to form a pair to output a PUF_value (as mentioned earlier with reference to FIG. 7), in which case, again, only one PUF_value may be output at any given time.

Furthermore, as explained earlier, if the primary use of the multi-purpose pin 120 is to carry a current signal (for example, a current supply signal), the state machine 1320 may stimulate the ECID storage 260 with a current signal and the signals received by the multiplexer 1330 may be current signals. In this case, the converter 620 may comprise an I-to-V converter and may output the series of analog values as voltage values $V_{bias}+V_{val}$.

Typically in the above examples, conversion of signal type (V-to-I or I-to-V) typically takes place just before the ECID is output to the multipurpose pin 120. However, it may alternatively take place elsewhere in the identity circuit 110. For example, the identity circuit 110 may be activated with a signal of a first type, for example current, which may then be converted to a signal of a second type, for example voltage, and used to read the ECID from the ECID storage 260, with the ECID then being output to the multipurpose pin 120 as a signal of the second type.

Aspects of the Disclosure

Non-limiting aspects of the disclosure are set out in the following numbered clauses.

1. An electronic device comprising:
    an identity unit configured to store an electronic chip identifier, ECID, that uniquely identifies the electronic chip; and
    a multi-purpose pin coupled to the identity unit, wherein the multi-purpose pin is for use in outputting the ECID from the electronic device and for a function unrelated to electronic chip identification,
    wherein the identity unit is configured to output the ECID from the electronic device using the multi-purpose pin such that the electronic device can be uniquely identified using the multi-purpose pin.
2. The electronic device of clause 1, wherein the function unrelated to electronic chip identification uses a signal of a first electrical type, and the identity unit is configured to output the ECID from the electronic device using a signal of a second electrical type,
    wherein the first electrical type is voltage and the second electrical type is current, or
    wherein the first electrical type is current and the second electrical type is voltage.
3. The electronic device of clause 2, wherein the function unrelated to electronic chip identification is a supply of power to the electronic device.
4. The electronic device of clause 3, wherein the multi-purpose pin is a first power supply pin, and
    wherein the electronic device further comprises a second power supply pin, and
    wherein the first power supply pin and the second power supply pin together form power interconnects for the electronic device.
5. The electronic device of any of clauses 2 to 4, wherein the identity unit comprises:
    a storage element for the ECID; and
    a readout unit for reading the ECID from the storage element and outputting the ECID to the multi-purpose pin.
6. The electronic device of clause 5, wherein the readout unit is configured to activate the storage element using an activation signal of the first electrical type, and
    wherein the readout element is configured to read the ECID from the storage element as one or more values of the first electrical type.
7. The electronic device of clause 5 or clause 6, wherein the readout unit comprises a signal converter configured to:
    read the ECID from the storage element as a signal of the first electrical type; and
    convert the ECID to a signal of the second electrical type and output it to the multi-purpose pin.
8. The electronic device of any preceding clause, wherein the identity unit is configured to output the ECID in the form of one or more analog values.
9. The electronic device of clause 8, wherein the identity unit is further configured to output a training signal from the electronic device using the multi-purpose pin, wherein the training signal is indicative of a full-scale of the one or more analog values and is suitable for use in digitally converting the one or more analog values.
10. The electronic device of any of clauses 1 to 7, wherein the identity unit is configured to output the ECID in the form of one or more digital values.
11. The electronic device of any preceding clause, wherein the identity unit comprises a physically unclonable function circuit for storing the ECID.
12. The electronic device of any preceding clause, further comprising an enable circuit coupled to at least one pin of the electronic device, wherein the enable circuit is configured to:
    monitor for an ECID enable condition at the at least one pin of the electronic device; and upon detecting an ECID enable condition at the at least one pin of the electronic device, activate the identity unit to output the ECID from the electronic device using the multi-purpose pin.

13. The electronic device of clause 12, wherein the enable circuit is configured to enable power to the identity unit upon detecting an ECID enable condition such that the identity unit turns on and outputs the ECID.

14. The electronic device of clause 12 or clause 13, wherein the ECID enable condition comprises an electrical signal having a predetermined characteristic.

15. The electronic device of clause 14, wherein the predetermined characteristic is any one or more of:
    a signal having a value that is less than a first predetermined threshold for at least a first predetermined period of time;
    a signal having a value that is greater than a second predetermined threshold for at least a second predetermined period of time;
    a signal comprising a predetermined modulated code.

16. The electronic device of any of clauses 12 to 15, wherein the at least one pin of the electronic device comprises the multi-purpose pin.

17. An electronic device comprising:
    an identity circuit configured to store an electronic chip identifier, ECID, that uniquely identifies the electronic chip, wherein the identity unit is normally off but is configured to turn on and output the ECID from the electronic device upon detecting an ECID enable condition.

18. The electronic device of clause 17, wherein the identity unit is configured to detect the ECID enable condition at a first pin of the electronic device and output the ECID to the first pin of the electronic device.

19. The electronic device of clause 17, wherein the identity unit is configured to detect the ECID enable condition at a first pin of the electronic device and output the ECID to a second pin of the electronic device.

20. The electronic device of any of clauses 17 to 20, wherein the ECID enable condition comprises an electrical signal having a predetermined characteristic that is any one or more of:
    a signal having a value that is less than a first predetermined threshold for at least a first predetermined period of time;
    a signal having a value that is greater than a second predetermined threshold for at least a second predetermined period of time;
    a signal comprising a predetermined modulated code.

21. An electronic device configured to store an electronic chip identifier, ECID, that uniquely identifies the electronic chip, wherein the electronic device comprises:
    a physically unclonable function, PUF, circuit for storing the ECID; and
    a readout unit for reading the ECID from the PUF circuit and outputting the ECID from the electronic device.

22. The electronic device of clause 21, wherein the readout unit is configured to output the ECID as a series of analog values.

23. The electronic device of clause 21, wherein the readout unit is configured to output the ECID as a series of digital values.

24. The electronic device of clause 23, wherein each PUF value read from the PUF circuit is output as a single-bit digital value or a multi-bit digital value.

The invention claimed is:

1. An electronic device comprising:
    an identity unit configured to store an electronic chip identifier (ECID) that uniquely identifies the electronic chip; and
    a multi-purpose pin coupled to the identity unit, wherein the multi-purpose pin is for use in outputting the ECID from the electronic device and for a function unrelated to electronic chip identification,
    wherein the identity unit is configured to output the ECID from the electronic device using the multi-purpose pin such that the electronic device can be uniquely identified using the multi-purpose pin;
    wherein the function unrelated to electronic chip identification uses a signal of a first electrical type, and the identity unit is configured to output the ECID from the electronic device using a signal of a second electrical type,
    wherein the first electrical type is voltage and the second electrical type is current, or
    wherein the first electrical type is current and the second electrical type is voltage.

2. The electronic device of claim 1, wherein the function unrelated to electronic chip identification is a supply of power to the electronic device.

3. The electronic device of claim 2, wherein the multi-purpose pin is a first power supply pin, and
    wherein the electronic device further comprises a second power supply pin, and
    wherein the first power supply pin and the second power supply pin together form power interconnects for the electronic device.

4. The electronic device of claim 1, wherein the identity unit comprises:
    a storage element for the ECID; and
    a readout unit for reading the ECID from the storage element and outputting the ECID to the multi-purpose pin.

5. The electronic device of claim 4, wherein the readout unit is configured to activate the storage element using an activation signal of the first electrical type, and
    wherein the readout element is configured to read the ECID from the storage element as one or more values of the first electrical type.

6. The electronic device of claim 4, wherein the readout unit comprises a signal converter configured to:
    read the ECID from the storage element as a signal of the first electrical type; and
    convert the ECID to a signal of the second electrical type and output it to the multi-purpose pin.

7. The electronic device of claim 1, wherein the identity unit is configured to output the ECID in the form of one or more analog values.

8. The electronic device of claim 7, wherein the identity unit is further configured to output a training signal from the electronic device using the multi-purpose pin, wherein the training signal is indicative of a full-scale of the one or more analog values and is suitable for use in digitally converting the one or more analog values.

9. The electronic device of claim 1, wherein the identity unit is configured to output the ECID in the form of one or more digital values.

10. The electronic device of claim 1, wherein the identity unit comprises a physically unclonable function circuit for storing the ECID.

11. The electronic device of claim 1, further comprising an enable circuit coupled to at least one pin of the electronic device, wherein the enable circuit is configured to:
- monitor for an ECID enable condition at the at least one pin of the electronic device; and
- upon detecting an ECID enable condition at the at least one pin of the electronic device, activate the identity unit to output the ECID from the electronic device using the multi- purpose pin.

12. The electronic device of claim 11, wherein the enable circuit is configured to enable power to the identity unit upon detecting an ECID enable condition such that the identity unit turns on and outputs the ECID.

13. The electronic device of claim 11, wherein the ECID enable condition comprises an electrical signal having a predetermined characteristic.

14. The electronic device of claim 13, wherein the predetermined characteristic is any one or more of:
- a signal having a value that is less than a first predetermined threshold for at least a first predetermined period of time;
- a signal having a value that is greater than a second predetermined threshold for at least a second predetermined period of time;
- a signal comprising a predetermined modulated code.

15. The electronic device of claim 11, wherein the at least one pin of the electronic device comprises the multi-purpose pin.

16. An electronic device comprising:
- an identity circuit configured to store an electronic chip identifier (ECID) that uniquely identifies the electronic chip, wherein the identity circuit is normally off but is configured to turn on and output the ECID from the electronic device upon detecting an ECID enable condition;
- wherein a function unrelated to electronic chip identification uses a signal of a first electrical type, and the identity circuit is configured to output the ECID from the electronic device using a signal of a second electrical type,
- wherein the first electrical type is voltage and the second electrical type is current, or
- wherein the first electrical type is current and the second electrical type is voltage.

17. The electronic device of claim 16, wherein the ECID enable condition comprises an electrical signal having a predetermined characteristic that is any one or more of:
- a signal having a value that is less than a first predetermined threshold for at least a first predetermined period of time;
- a signal having a value that is greater than a second predetermined threshold for at least a second predetermined period of time;
- a signal comprising a predetermined modulated code.

18. An electronic device configured to store an electronic chip identifier (ECID) that uniquely identifies the electronic chip, wherein the electronic device comprises:
- a physically unclonable function (PUF) circuit for storing the ECID; and
- a readout unit for reading the ECID from the PUF circuit and outputting the ECID from the electronic device;
- wherein the function unrelated to electronic chip identification uses a signal of a first electrical type, and an identity unit is configured to output the ECID from the electronic device using a signal of a second electrical type,
- wherein the first electrical type is voltage and the second electrical type is current, or
- wherein the first electrical type is current and the second electrical type is voltage.

19. The electronic device of claim 18, wherein the readout unit is configured to output the ECID as a series of analog values.

* * * * *